United States Patent
Yang et al.

(10) Patent No.: US 12,082,032 B2
(45) Date of Patent: *Sep. 3, 2024

(54) REPORTING INTERFERENCE AND NOISE POWER FLUCTUATIONS

(71) Applicant: Apple Inc., Cupertino, CA (US)

(72) Inventors: Weidong Yang, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Jie Cui, San Jose, CA (US); Manasa Raghavan, Sunnyvale, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 17/593,453

(22) PCT Filed: Sep. 15, 2020

(86) PCT No.: PCT/CN2020/115327
§ 371 (c)(1),
(2) Date: Sep. 19, 2021

(87) PCT Pub. No.: WO2022/056674
PCT Pub. Date: Mar. 24, 2022

(65) Prior Publication Data
US 2022/0303810 A1  Sep. 22, 2022

(51) Int. Cl.
*H04W 24/10* (2009.01)
*H04W 72/0446* (2023.01)
(Continued)

(52) U.S. Cl.
CPC ....... *H04W 24/10* (2013.01); *H04W 72/0446* (2013.01); *H04W 72/0453* (2013.01); *H04W 72/541* (2023.01)

(58) Field of Classification Search
None
See application file for complete search history.

(56) References Cited

U.S. PATENT DOCUMENTS

| 2014/0211646 | A1 | 7/2014 | Ji et al. |
| 2015/0092705 | A1* | 4/2015 | Somasundaram ... H04J 11/0023 370/329 |

(Continued)

FOREIGN PATENT DOCUMENTS

| CN | 104428997 | 3/2015 |
| CN | 111082911 | 4/2020 |

(Continued)

OTHER PUBLICATIONS

ZTE, "Enhancements on multi-beam operation"; 3GPP TSG RAN WG1 Meeting #98bis; R1-1910285; Oct. 20, 2019; 24 sheets.

(Continued)

*Primary Examiner* — Christopher T Wyllie
(74) *Attorney, Agent, or Firm* — Fay Kaplun & Marcin, LLP

(57) ABSTRACT

A user equipment (UE) is configured to report channel state information (CSI) to a base station of a network. The UE receives configuration information from the base station including one or more interference measurement resources (IMRs) to be measured by the UE, determines a noise power for each of the IMRs, transmits a reference channel state
(Continued)

information (CSI) report the base station, measures CSI reference signals (CSI RS) transmitted by the base station to determine an interference and noise power for each of the one or more IMRs and transmits a new CSI report including one of i) only interference and noise power fluctuation feedback or ii) multiple signal-to-interference-plus-noise ratio (SINR) or SINR statistics to the base station.

13 Claims, 4 Drawing Sheets

(51) Int. Cl.
*H04W 72/0453* (2023.01)
*H04W 72/541* (2023.01)

(56) References Cited

U.S. PATENT DOCUMENTS

| | | | |
|---|---|---|---|
| 2016/0198355 A1 | 7/2016 | Wang et al. | |
| 2020/0145866 A1 | 5/2020 | Onggosanusi et al. | |
| 2020/0220631 A1 | 7/2020 | Onggosanusi et al. | |
| 2021/0099271 A1* | 4/2021 | Zhang | H04L 5/0057 |
| 2021/0211176 A1* | 7/2021 | Gao | H04B 7/0626 |
| 2021/0218540 A1* | 7/2021 | Song | H04W 24/10 |
| 2021/0329473 A1* | 10/2021 | Zhang | H04W 16/28 |
| 2021/0351838 A1 | 11/2021 | Zhang et al. | |
| 2021/0351902 A1* | 11/2021 | Zhang | H04L 5/0051 |
| 2022/0006501 A1* | 1/2022 | Kim | H04W 24/10 |
| 2022/0069889 A1* | 3/2022 | Zhang | H04B 7/088 |
| 2022/0140960 A1* | 5/2022 | Gao | H04L 5/0023 370/336 |
| 2022/0232407 A1* | 7/2022 | Rahman | H04L 5/0035 |
| 2022/0256387 A1* | 8/2022 | Xiao | H04L 5/0053 |
| 2022/0279370 A1* | 9/2022 | Guan | H04B 7/0695 |
| 2022/0303048 A1* | 9/2022 | Yang | H04L 25/0224 |
| 2022/0303810 A1* | 9/2022 | Yang | H04W 72/0446 |
| 2022/0393838 A1* | 12/2022 | Zhang | H04B 7/0645 |
| 2022/0416861 A1 | 12/2022 | Manolakos et al. | |
| 2023/0085425 A1 | 3/2023 | Uesaka et al. | |
| 2023/0122910 A1 | 4/2023 | Li et al. | |
| 2023/0141397 A1* | 5/2023 | Kim | H04B 7/0632 370/329 |
| 2023/0208490 A1 | 6/2023 | Kim et al. | |
| 2023/0319605 A1* | 10/2023 | Park | H04J 11/00 370/252 |
| 2023/0388069 A1* | 11/2023 | Sakhnini | H04L 5/0044 |

FOREIGN PATENT DOCUMENTS

| | | |
|---|---|---|
| EP | 3 471 451 | 4/2019 |
| EP | 3 605 926 | 2/2020 |
| WO | 2019/070094 | 4/2019 |

OTHER PUBLICATIONS

Futurewei, "CSI feedback enhancements for URLLC"; 3GPP TSG RAN WG1 Meeting #102-e; R1-2005281; Aug. 28, 2020; 6 sheets.
Huawei et al., "Channel and interference measurement for CSI acquisition"; 3GPP TSG RAN WG1 Meeting #89; R1-1706927; May 19, 2017; 12 sheets.
Vivo: "CSI feedback enhancements for Rel-17 URLLC", 3GPP TSG RAN WG1 #102-e, R1-2005375, Aug. 8, 2020, 4 sheets.
Nokia et al., "Dynamic network coordination for URLLC in the 5G New Radio", 3GPP TSG RAN WG1 NR Ad-Hoc Meeting, R1-1701108, Jan. 9, 2017, 5 sheets.

\* cited by examiner

REPORTING INTERFERENCE AND NOISE POWER FLUCTUATIONS

BACKGROUND

In 5G new radio (NR) wireless communications, the 5G NR network may assign one or more frequency sub-bands to a user equipment (UE) to exchange information with the network. These sub-bands are allocated to the UE based on measured channel conditions that the UE reports to a next generation-NodeB (gNB) of the network. In addition, an optimal modulation and coding scheme (MCS) is selected by the network based on the measured channel conditions. A mean signal-to-noise and interference ratio (SINR) and a SINR standard deviation may be used by the UE to model the SINR and reported to the network to help the gNB select the optimal MCS. Alternatively, the SINR can be modelled using a gamma distribution for improved power control.

SUMMARY

Some exemplary embodiments are related to a user equipment (UE) having a transceiver configured to communicate with a base station and a processor communicatively coupled to the transceiver and configured to perform operations. The operations include receiving configuration information from the base station including one or more interference measurement resources (IMRs) to be measured by the UE, determining a noise power for each of the IMRs, transmitting a reference channel state information (CSI) report the base station, measuring CSI reference signals (CSI RS) transmitted by the base station to determine an interference and noise power for each of the one or more IMRs and transmitting a new CSI report including one of i) only interference and noise power fluctuation feedback or ii) multiple signal-to-interference-plus-noise ratio (SINR) or SINR statistics to the base station.

Other exemplary embodiments relate to one or more processors that are configured to perform operations. The operations include receiving configuration information from a base station including one or more interference measurement resources (IMRs) to be measured by the UE, determining a noise power for each of the IMRs, transmitting a reference channel state information (CSI) report to the base station, measuring CSI reference signals (CSI RS) transmitted by the base station to determine an interference and noise power for each of the one or more IMRs and transmitting a new CSI report including one of i) only interference and noise power fluctuation feedback or ii) multiple signal-to-interference-plus-noise ratio (SINR) or SINR statistics to the base station.

Still further exemplary embodiments relate to a method that includes receiving configuration information from a base station including one or more interference measurement resources (IMRs) to be measured by a user equipment (UE), determining a noise power for each of the IMRs, transmitting a reference channel state information (CSI) report to the base station, measuring CSI reference signals (CSI RS) transmitted by the base station to determine an interference and noise power for each of the one or more IMRs and transmitting a new CSI report including one of i) only interference and noise power fluctuation feedback or ii) multiple signal-to-interference-plus-noise ratio (SINR) or SINR statistics to the base station.

DETAILED DESCRIPTION

Figure 1:
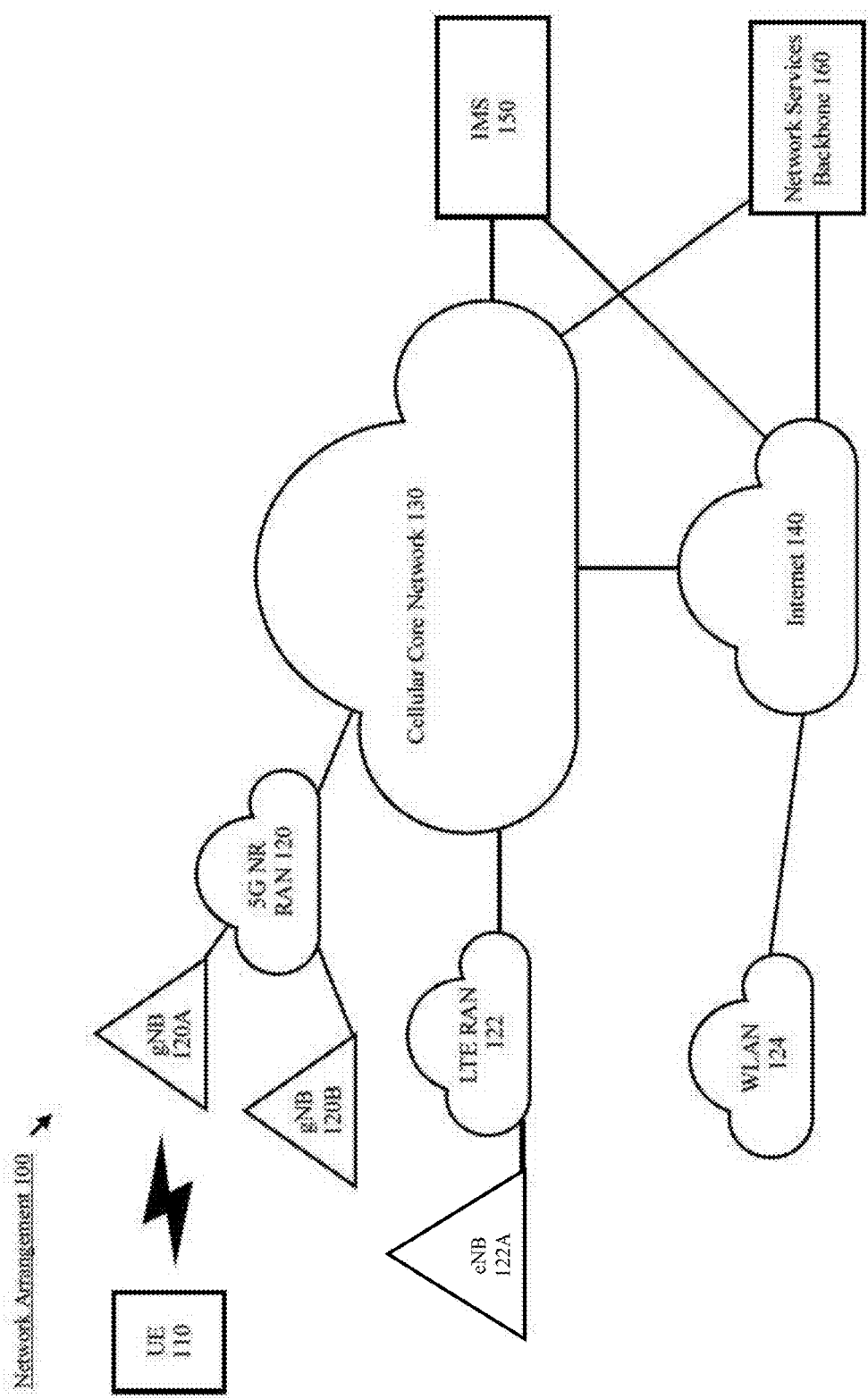
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method for a user equipment (UE) connected to a 5G new radio (NR) network to determine cell interference fluctuation and provide feedback regarding such interference fluctuation to a next generation-NodeB (gNB) of the network.

The exemplary embodiments are described with regard to a network that includes 5G new radio NR radio access technology (RAT). However, the exemplary embodiments may be implemented in other types of networks using the principles described herein.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

Deployment of ultra-reliable and low latency communications (URLLC) is expected to be in the frequency range 1 (FR1) of NR because the channel state does not vary as easily as frequency range 2 (FR2). As such, a change in the signal-to-noise and interference ratio (SINR) is more often caused by fluctuations in interference than by channel variations. Such interference may be caused by, for example, other cell interference, multiuser (MU) interference, etc. 5G NR has an increased flexibility in physical downlink control channel (PDCCH) monitoring/mini-slot scheduling that may cause an increase in interference fluctuation. However, tasking a UE with sending frequent CSI reports to the gNB is extremely burdensome on the UE (e.g., increased monitoring, increased power consumption, etc.).

According to some exemplary embodiments, a new Channel State Information (CSI) report quantity may be defined in so that the UE can send a CSI report including only interference and noise measurements instead of a conventional CSI report including other channel measurements as well. Such a report would advantageously be less burdensome on the UE and would provide the gNB with more useful information in determining a modulation and coding scheme (MCS) to be used.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
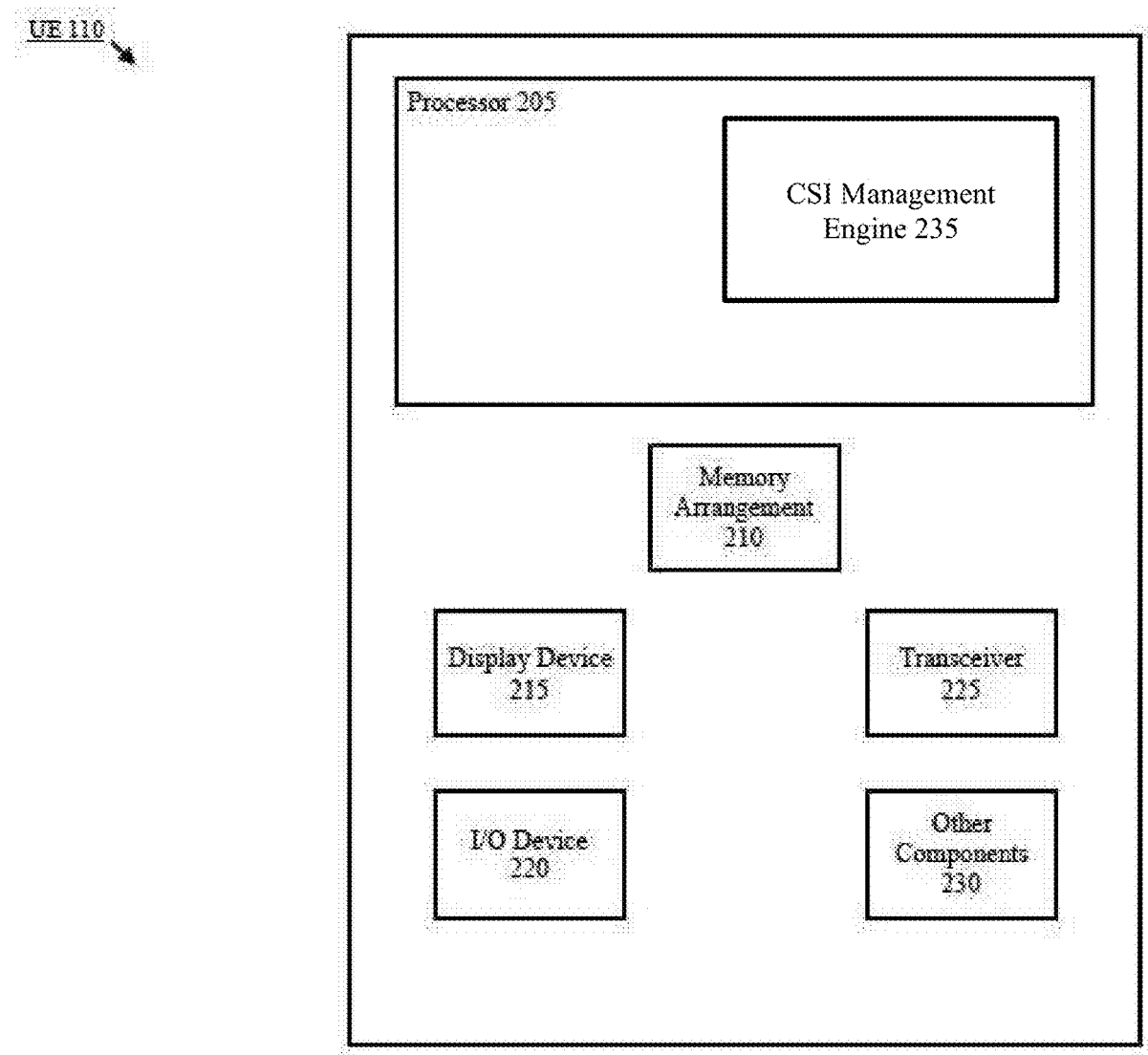
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a CSI management engine 235. The CSI management engine 235 may perform various operations related to measuring interference on allocated interference measurement blocks (IMR) and providing interference fluctuation feedback to the network (e.g., via the gNB 120A or 120B).

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
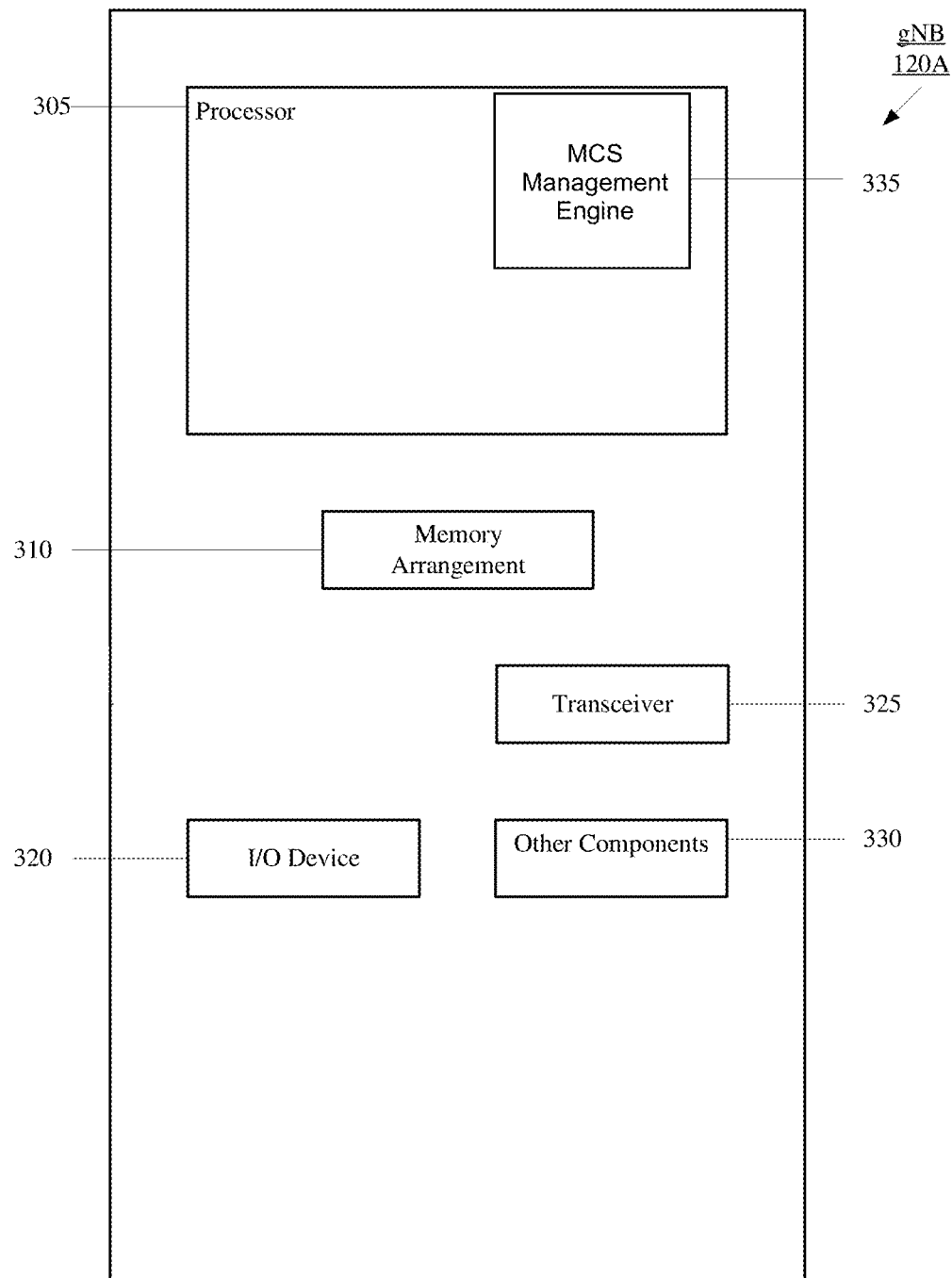
FIG. 3 shows an exemplary base station configured to establish a connection with a user equipment according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a modulation and coding scheme (MCS) management engine 335 for performing operations including determining an MCS for a UE based on interference fluctuation feedback received from the UE. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
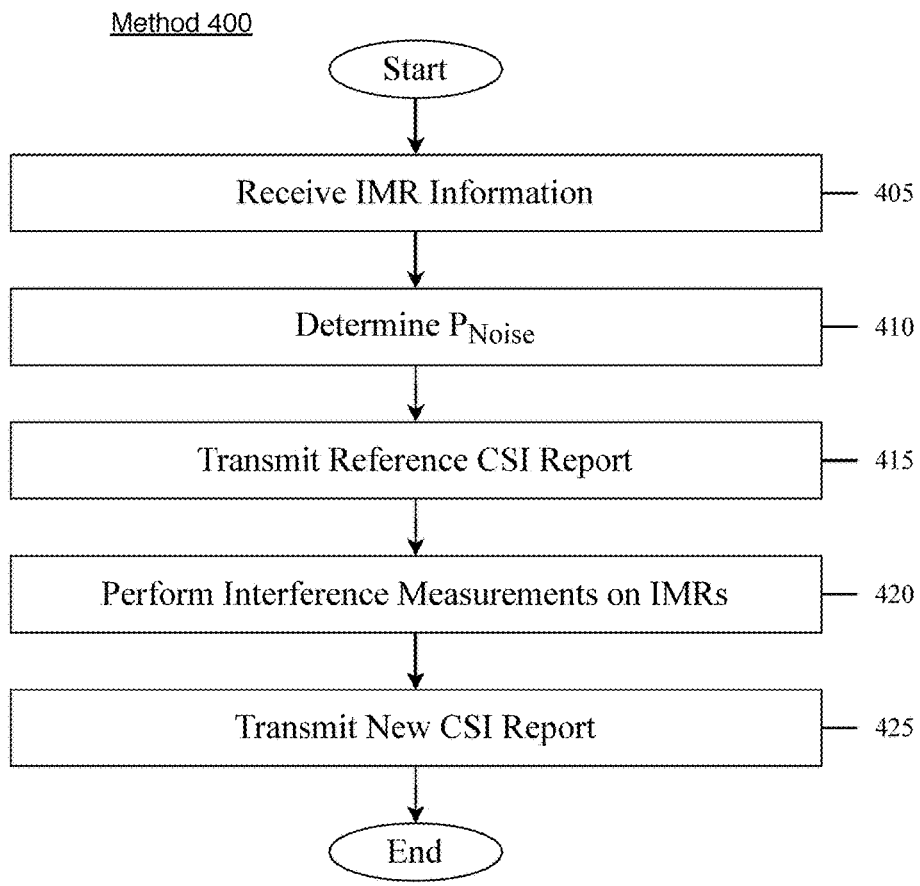
FIG. 4 shows a method of reporting interference fluctuation according to various exemplary embodiments.

FIG. 4 shows a method 400 of reporting interference fluctuation according to various exemplary embodiments. The method 400 of FIG. 4 includes providing the network (e.g., gNB) with a new type of CSI report that includes only interference and noise measurements be less burdensome on the UE but still provide the network with information for determining a modulation and coding scheme (MCS) to be used. As will be described below, a reference report may be generated and linked to the new CSI report to provide normalized values for the reporting of the interference and noise in the new CSI report. Thus, throughout this description, the term "new CSI report" will refer to the CSI report that includes only interference and noise measurements and "reference CSI report" will refer to a report that provides the network with normalized values for the new CSI report. The new CSI report may also include multiple SINRs or SINR statistics. The SINR is based on a ratio of a reference signal (the desired signal) versus the interference-plus noise measurement. Thus, the desired signal may be used to normalize the new CSI report. In the example of FIG. 4, it may be considered that the UE 110 is camped on the gNB 120A and will be providing the reference CSI report and the new CSI report to the gNB 120A.

At 405, the UE receives configuration information from the gNB 120A identifying resource elements (REs) as interference measurement resources (IMRs) for which the UE 110 is to determine an interference fluctuation. In some embodiments, the IMRs are within the same slot. In some embodiments, the IMRs may alternatively or additionally be across different slots. Examples of IMRs will be provided below with reference to FIG. 5.

At 410, the UE 110 determines a noise power ($P_{Noise}$) associated with a zero power (ZP) interference measurement resource (IMR) to generate a conventional CSI report. As those skilled in the art will understand, zero-power means that the resource element is used for a non-zero power (NZP) CSI reference signal (CSI RS) from a different component, e.g., the gNB 120B. Thus, at 410, the UE 110 measures the CSI RS from gNB 120B for the purposes of normalizing the interference and noise values to be included in the new CSI report in subsequent operations. At 415, the UE 110 sends a reference CSI report to the gNB 120A (e.g., a channel quality indicator (CQI), a rank indicator (RI), a precoding matrix indicator (PMI), etc.). In some embodiments, if the new CSI report includes multiple SINRs and/or SINR statistics, at 410, the UE 110 determines a desired signal power associated with the channel measurement resource (CMR) to generate a conventional CSI report.

The reference CSI report may be sent to the gNB 120A based on a number of factors. For example, the reference CSI reports may be sent by the UE 110 based on a schedule, on a periodic basis, based on an event (e.g., a request from the gNB 120A, a mobility threshold of the UE 110, etc.), etc. Thus, the reference CSI report may correspond to one or more new CSI reports, e.g., the normalized values in the reference CSI report may be used for one or more new CSI reports. Thus, the operations 410 and 415 are related to generating and reporting the reference CSI report. As will be described in greater detail below, the operations 420 and 425 are related to generating and reporting the new CSI report. The operations 420 and 425 (new CSI report) may be performed multiple times for a single instance of performing the operations 410 and 415 (reference CSI report). In some embodiments, the conventional report and the new CSI report may be sent together.

At 420, the UE 110 performs interference measurements on the IMRs allocated to the UE 110 by the gNB 120A (at 405). It should be understood that the IMRs used for the interference measurements may include none/part of/all of the IMRs configured for the conventional CSI report. At 425, the UE 110 provides interference fluctuation feedback to the gNB 120A so that the gNB 120A may determine the MCS for the UE 110 given the interference fluctuation. The interference feedback will be described in greater detail below. As described above, this feedback may be a new CSI report defined as "Interference+Noise Only" or "multiple SINRs and/or SINRs statistics." The reference CSI report (from 415) may be functionally linked to the new CSI report so that the reference CSI report can serve as a baseline (benchmark).

For purposes of reporting the values in the new CSI report, the type of feedback may depend on the number of IMRs that are to be measured and reported. The following examples use the number of four (4) IMRs as an exemplary threshold for reporting. However, it should be understood that the threshold may be set at any value. In some exemplary embodiments, if the number of IMRs is less than or equal to four (4) IMRs, the UE 110 reports a normalized interference and noise power (measured interference and noise power with respect to $P_{Noise}$) to the gNB 120A for each IMR. In some embodiments, if the number of IMRs is greater than four (4) IMRs, the noise/interference may alternatively be modelled using, for example, a gamma distribution so that the UE 110 is not overburdened with reporting a large number of interference and noise power values. In such a scenario, the UE 110 may include the parameters for the modelling in the feedback provided to the gNB 120A. In the case of a gamma distribution, these parameters are $\bar{\gamma}$ and m, where $\bar{\gamma}$ is average interference and noise power and m is a shape factor. The probability density function is defined as $$P_{\bar{\gamma},m}(\gamma) = \frac{m^m \gamma^{m-1}}{\bar{\gamma}^m \Gamma(m)} e^{\frac{-m\gamma}{\bar{\gamma}}}$$

where $\Gamma(m)$ is the gamma function. If m is large, then there is essentially little variation in the observed interference and noise power. If, however, m is small, then there are possibly substantial fluctuations in the interference and noise power. To determine the parameters $\bar{\gamma}$ and m, the UE 110 may use the following functions $$\hat{\bar{\gamma}} = \sum_{K=1}^{K} \gamma_k$$

$$\hat{m} = \frac{1}{2\left(\log \hat{\bar{\gamma}} - \frac{\sum_{k=1}^{K} \log \gamma_k}{K}\right)}$$

where $\gamma_k$ is the measured interference and noise power in a given IMR k, with $1 \leq k \leq K$. In some embodiments, $\hat{\bar{\gamma}}$ is normalized using the CSI report based on the IMRs of the reference signal. In some embodiments, uniform quantization in the log domain with saturation may be used. In some embodiments, $\hat{m}$ is quantized with a non-uniform range such as, for example, <1, [1, 10], [10 20]), [20, 200), [200, +∞). The intervals for both $\hat{\bar{\gamma}}$ and $\hat{m}$ may either be specified in the 3GPP standards or configured via RRC.

The tail distribution of the statistical model may be of differing importance to the gNB scheduling depending on whether it is on the lower tail or the higher tail. For example, when forming the statistical model, fitting the higher tail for interference plus noise (or the lower tail for SINR) may be prioritized by the UE. In some exemplary embodiments, the UE processing to prioritize fitting on the higher tail for interference plus noise or the lower tail for SINR may be defined by the relevant standards (e.g., 3GPP standards), may be signaled to the UE by the network or may be preprogrammed into the UE.

Figure 5:
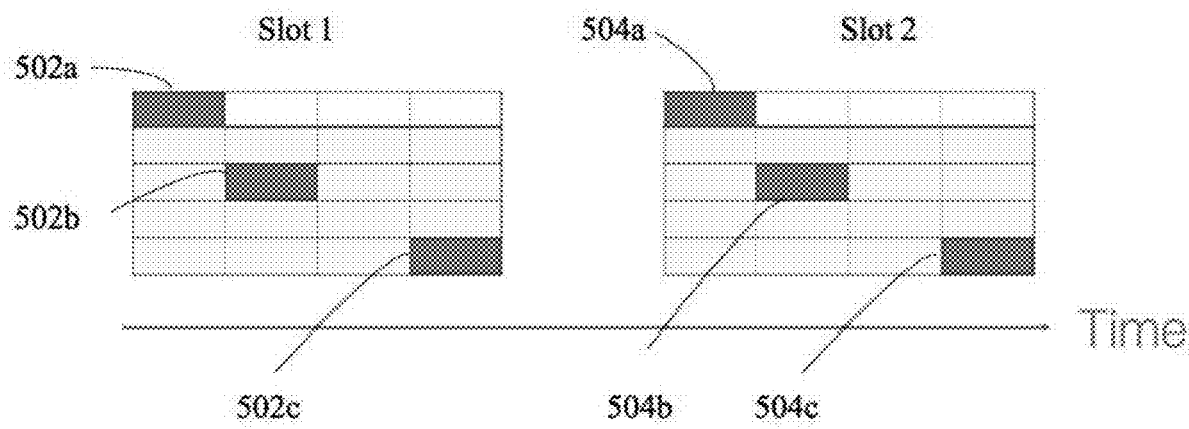
FIG. 5 shows exemplary resource blocks allocated by a g-NodeB to a UE for interference measurements according to various exemplary embodiments.

FIG. 5 shows resource blocks of an exemplary reference signal allocated by the gNB 120A to the UE 110 for interference measurements according to various exemplary embodiments. These resource blocks are merely illustrative examples of the IMRs allocated for the UE 110 by the gNB 120A for interference and noise power measurements. As noted above, the IMRs 502*a-c* in slot 1 or 504*a-c* in slot 2 may within the same slot or, alternatively, the IMRS 502*a-c* and 504*a-c* may be across different slots (slot 1 and slot 2). The more IMRs allocated to the UE 110, the more measurements the UE 110 can take, which advantageously helps the gNB 120A select the MCS.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
   a transceiver configured to communicate with a base station; and
   a processor communicatively coupled to the transceiver and configured to perform operations comprising:
   receiving configuration information from the base station including one or more interference measurement resources (IMRs) to be measured by the UE;
   determining a noise power for each of the IMRs;
   transmitting a reference channel state information (CSI) report the base station;
   measuring CSI reference signals (CSI RS) transmitted by the base station to determine an interference and noise power for each of the one or more IMRs; and
   transmitting a new CSI report including one of i) only interference and noise power fluctuation feedback or ii) multiple signal-to-interference-plus-noise ratio (SINR) or SINR statistics to the base station,
   wherein, when the one or more IMRs is less than or equal to a predetermined number of IMRs, the new CSI report includes a measured interference and noise power for each IMR.

2. The UE of claim 1, wherein the one or more IMRs are one of in a same slot or are in different slots.

3. The UE of claim 1, wherein the base station is a next generation node B (gNB) of a New Radio (NR) network.

4. The UE of claim 3, wherein the one or more IMRs are in the Frequency Range 1 (FR1) of the NR network.

5. One or more processors configured to perform operations comprising:
   receiving configuration information from a base station including one or more interference measurement resources (IMRs) to be measured by a user equipment (UE);
   determining a noise power for each of the IMRs;
   transmitting a reference channel state information (CSI) report to the base station;
   measuring CSI reference signals (CSI RS) transmitted by the base station to determine an interference and noise power for each of the one or more IMRs; and
   transmitting a new CSI report including one of i) only interference and noise power fluctuation feedback or ii)

multiple signal-to-interference-plus-noise ratio (SINR) or SINR statistics to the base station, wherein, when the one or more IMRs is greater than a predetermined number of IMRs, the new CSI report includes parameters to model interference and noise power fluctuation.

6. The one or more processors of claim 5, wherein a gamma distribution is used to model the interference and noise power fluctuation, and wherein the parameters include an average interference and noise power ($\gamma$) and a shape factor (m).

7. The one or more processors of claim 5, wherein the one or more IMRs are one of in a same slot or are in different slots.

8. The one or more processors of claim 5, wherein the base station is a next generation node B (gNB) of a New Radio (NR) network.

9. The one or more processors of claim 8, wherein the one or more IMRs are in the Frequency Range 1 (FR1) of the NR network.

10. A method, comprising:
receiving configuration information from a base station including one or more interference measurement resources (IMRs) to be measured by a user equipment (UE);
determining a noise power for each of the IMRs;
transmitting a reference channel state information (CSI) report to the base station;
measuring CSI reference signals (CSI RS) transmitted by the base station to determine an interference and noise power for each of the one or more IMRs; and
transmitting a new CSI report including one of i) only interference and noise power fluctuation feedback or ii) multiple signal-to-interference-plus-noise ratio (SINR) or SINR statistics to the base station, wherein, when the one or more IMRs is less than or equal to a predetermined number of IMRs, the new CSI report includes a measured interference and noise power for each IMR, or wherein, when the one or more IMRs is greater than a predetermined number of IMRs, the new CSI report includes parameters to model interference and noise power fluctuation.

11. The method of claim 10, wherein, when the one or more IMRs is greater than the predetermined number of IMRs, a gamma distribution is used to model the interference and noise power fluctuation, and wherein the parameters include an average interference and noise power ($\gamma$) and a shape factor (m).

12. The method of claim 10, wherein the one or more IMRs are one of in a same slot or are in different slots.

13. The method of claim 10, wherein the base station is a next generation node B (gNB) of a New Radio (NR) network and wherein the one or more IMRs are in the Frequency Range 1 (FR1) of the NR network.

* * * * *